United States Patent
Nordback (10) Patent No.: US 8,570,340 B2
(45) Date of Patent: Oct. 29, 2013

(54) SYSTEMS AND METHODS FOR DATA COMPRESSION

(75) Inventor: Kurt Nathan Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 870 days.

(21) Appl. No.: 12/060,235

(22) Filed: Mar. 31, 2008

(65) Prior Publication Data

US 2009/0245628 A1 Oct. 1, 2009

(51) Int. Cl.
*G09G 5/02* (2006.01)
*G06K 9/00* (2006.01)

(52) U.S. Cl.
USPC ........... 345/600; 345/589; 345/601; 345/602; 345/603; 345/604; 382/162; 382/163; 382/164; 382/165; 382/166

(58) Field of Classification Search
USPC ............................ 345/589–604; 382/162–167
See application file for complete search history.

(56) References Cited

U.S. PATENT DOCUMENTS

| | | | |
|---|---|---|---|
| 5,313,570 A | 5/1994 | Dermer et al. |
| 5,315,691 A | 5/1994 | Sumiya |
| 5,555,094 A | 9/1996 | Lefebvre et al. |
| 5,687,303 A | 11/1997 | Motamed et al. |
| 5,748,331 A | 5/1998 | Kohler |
| 6,169,607 B1 | 1/2001 | Harrington |
| 6,178,007 B1 | 1/2001 | Harrington |
| 6,179,485 B1 | 1/2001 | Harrington |
| 6,195,674 B1 | 2/2001 | Elbourne et al. |
| 6,201,551 B1 | 3/2001 | Loce et al. |
| 6,222,648 B1 | 4/2001 | Wolf et al. |
| 6,236,754 B1 | 5/2001 | Harrington |
| 6,237,079 B1 | 5/2001 | Stoney |
| 6,246,396 B1 | 6/2001 | Gibson et al. |
| 6,246,419 B1 | 6/2001 | Loce et al. |
| 6,252,677 B1 | 6/2001 | Hawes et al. |
| 6,259,456 B1 | 7/2001 | Gibson et al. |
| 6,269,184 B1 | 7/2001 | Spaulding et al. |

(Continued)

FOREIGN PATENT DOCUMENTS

EP 924651 6/1999
JP 07-306938 A 11/1995

(Continued)

OTHER PUBLICATIONS

U.S. Appl. No. 11/771,973, filed Jun. 29, 2007.

(Continued)

*Primary Examiner* — David T Welch
*Assistant Examiner* — Matthew D Salvucci
(74) *Attorney, Agent, or Firm* — Finnegan, Henderson, Farabow, Garrett & Dunner, L.L.P.

(57) ABSTRACT

Systems and methods are provided for demoting color data associated with at least one entity, wherein the entity comprises at least one sub-entity. The at least one sub-entity may be marked as demotable, if the color data associated with the at least one sub-entity is demotable. The at least one entity may be marked as demotable, if all sub-entities enclosed in the at least one entity are demotable. The color data of at least one marked rasterizable entity may be demoted, wherein the at least one marked rasterizable entity may be selected from a set comprising of marked entities and marked sub-entities.

23 Claims, 3 Drawing Sheets

(56) References Cited

U.S. PATENT DOCUMENTS

| | | |
|---|---|---|
| 6,272,257 B1 | 8/2001 | Prokop |
| 6,275,607 B1 | 8/2001 | Shimizu et al. |
| 6,289,138 B1 | 9/2001 | Yip et al. |
| 6,302,522 B1 | 10/2001 | Rumph et al. |
| 6,311,258 B1 | 10/2001 | Gibson et al. |
| 6,313,842 B1 * | 11/2001 | Tampieri ............... 345/426 |
| 6,324,305 B1 | 11/2001 | Holladay et al. |
| 6,336,180 B1 | 1/2002 | Long et al. |
| 6,349,379 B2 | 2/2002 | Gibson et al. |
| 6,360,007 B1 | 3/2002 | Robinson et al. |
| 6,369,909 B1 | 4/2002 | Shima |
| 6,393,545 B1 | 5/2002 | Long et al. |
| 6,414,687 B1 | 7/2002 | Gibson |
| 6,421,140 B1 | 7/2002 | Hui |
| 6,490,696 B1 | 12/2002 | Wood et al. |
| 6,507,898 B1 | 1/2003 | Gibson et al. |
| 6,515,763 B1 | 2/2003 | Dermer et al. |
| 6,633,297 B2 | 10/2003 | McCormack et al. |
| 6,642,931 B1 | 11/2003 | Haikin et al. |
| 6,674,536 B2 | 1/2004 | Long et al. |
| 6,707,463 B1 | 3/2004 | Gibson et al. |
| 6,727,999 B1 | 4/2004 | Takahashi |
| 6,774,953 B2 | 8/2004 | Champion et al. |
| 6,781,720 B1 | 8/2004 | Klassen |
| 6,791,711 B1 | 9/2004 | Uekusa et al. |
| 6,792,485 B2 | 9/2004 | Aoki et al. |
| 6,819,782 B1 | 11/2004 | Imagawa et al. |
| 6,839,150 B1 | 1/2005 | Sugiura et al. |
| 6,839,461 B2 | 1/2005 | Tomomatsu |
| 6,862,110 B2 | 3/2005 | Harrington |
| 6,870,636 B2 | 3/2005 | Kulkarni |
| 6,873,432 B1 | 3/2005 | Thieret |
| 6,876,825 B2 | 4/2005 | Kurahashi et al. |
| 6,886,912 B2 | 5/2005 | Mantell |
| 6,891,970 B1 | 5/2005 | Suzuki |
| 6,906,834 B1 | 6/2005 | Kagawa et al. |
| 6,912,059 B1 | 6/2005 | Takahashi |
| 6,930,788 B1 | 8/2005 | Iwamoto et al. |
| 6,930,809 B1 | 8/2005 | Kagawa et al. |
| 6,954,288 B2 | 10/2005 | Uekusa et al. |
| 6,985,245 B1 | 1/2006 | Takahashi |
| 6,990,039 B2 | 1/2006 | Hirai |
| 6,995,864 B1 | 2/2006 | Sugiura et al. |
| 7,012,639 B1 | 3/2006 | Ishikawa et al. |
| 7,016,061 B1 | 3/2006 | Hewitt |
| 7,072,052 B1 | 7/2006 | Tanahashi et al. |
| 7,079,276 B2 | 7/2006 | Kimura |
| 7,084,994 B1 | 8/2006 | Koppich et al. |
| 7,092,654 B2 | 8/2006 | Kurahashi et al. |
| 7,116,821 B2 | 10/2006 | Lane et al. |
| 7,119,920 B2 | 10/2006 | Takahashi |
| 7,119,927 B2 | 10/2006 | Sugiura et al. |
| 7,123,381 B2 | 10/2006 | Klassen |
| 7,136,523 B2 | 11/2006 | Fukao et al. |
| 7,142,318 B2 | 11/2006 | Lopez et al. |
| 7,142,710 B2 | 11/2006 | Hung |
| 7,171,442 B1 | 1/2007 | Huang |
| 7,190,827 B2 | 3/2007 | Zeng et al. |
| 7,263,218 B2 | 8/2007 | Altenhof-Long et al. |
| 7,274,487 B2 | 9/2007 | Fukasawa |
| 7,283,266 B2 | 10/2007 | Yagita |
| 7,292,949 B2 | 11/2007 | Ding |
| 7,296,791 B2 | 11/2007 | Kurahashi et al. |
| 7,321,450 B2 | 1/2008 | Uekusa et al. |
| 7,359,530 B2 | 4/2008 | Wilson |
| 7,359,576 B1 | 4/2008 | Worthington et al. |
| 7,423,781 B2 | 9/2008 | Morimoto et al. |
| 7,538,896 B2 | 5/2009 | Tanaka |
| 7,598,964 B2 | 10/2009 | Olson |
| 7,804,630 B2 | 9/2010 | Nishikawa |
| 7,830,540 B2 | 11/2010 | Matsuda |
| 7,903,286 B2 | 3/2011 | Nordback |
| 2001/0021971 A1 | 9/2001 | Gibson et al. |
| 2002/0051193 A1 | 5/2002 | Oki |
| 2002/0057446 A1 | 5/2002 | Long et al. |
| 2002/0063911 A1 | 5/2002 | Hui |
| 2002/0069236 A1 | 6/2002 | Jahnke |
| 2002/0075493 A1 | 6/2002 | Harrington |
| 2002/0075501 A1 | 6/2002 | Mantell et al. |
| 2002/0085224 A1 | 7/2002 | Price et al. |
| 2003/0016305 A1 | 1/2003 | Champion et al. |
| 2003/0034986 A1 | 2/2003 | Fukasawa |
| 2003/0098986 A1 | 5/2003 | Pop |
| 2003/0138142 A1 | 7/2003 | Hung |
| 2003/0142330 A1 | 7/2003 | Arakawa |
| 2003/0147088 A1 | 8/2003 | Kulkarni |
| 2003/0164971 A1 | 9/2003 | Kidani et al. |
| 2004/0017585 A1 | 1/2004 | Makishima et al. |
| 2004/0021882 A1 | 2/2004 | Kakutani |
| 2004/0021900 A1 | 2/2004 | Arakawa |
| 2004/0032615 A1 | 2/2004 | Kurakata |
| 2004/0042035 A1 | 3/2004 | Uejo |
| 2004/0042037 A1 | 3/2004 | Uejo |
| 2004/0042038 A1 | 3/2004 | Uejo |
| 2004/0101195 A1 | 5/2004 | Akaishi |
| 2004/0135845 A1 | 7/2004 | Mantell |
| 2004/0141642 A1 | 7/2004 | Zeng et al. |
| 2004/0151361 A1 | 8/2004 | Bedard et al. |
| 2004/0169876 A1 | 9/2004 | Takahashi |
| 2004/0184658 A1 | 9/2004 | Inoue |
| 2004/0212814 A1 | 10/2004 | Ishigami |
| 2004/0223173 A1 | 11/2004 | Arai |
| 2004/0223174 A1 | 11/2004 | Mikami |
| 2004/0252345 A1 | 12/2004 | Uekusa et al. |
| 2004/0257596 A1 | 12/2004 | Mestha et al. |
| 2005/0018228 A1 | 1/2005 | Takahashi |
| 2005/0021970 A1 | 1/2005 | Reese et al. |
| 2005/0027482 A1 | 2/2005 | Benaoudia et al. |
| 2005/0117398 A1 | 6/2005 | Hirai |
| 2005/0131907 A1 | 6/2005 | Matsuzawa et al. |
| 2005/0135672 A1 | 6/2005 | Altenhof-Long et al. |
| 2005/0180771 A1 | 8/2005 | Kurahashi et al. |
| 2005/0185840 A1 | 8/2005 | Sugiura et al. |
| 2005/0213117 A1 | 9/2005 | Clark et al. |
| 2005/0259287 A1 | 11/2005 | Watanabe |
| 2005/0275856 A1 * | 12/2005 | Oki ............... 358/1.9 |
| 2005/0289346 A1 | 12/2005 | Minagawa |
| 2006/0001728 A1 | 1/2006 | Murakami |
| 2006/0013477 A1 * | 1/2006 | Pellar ............... 382/162 |
| 2006/0033956 A1 | 2/2006 | Takahashi |
| 2006/0034630 A1 | 2/2006 | Yabe |
| 2006/0061794 A1 | 3/2006 | Ito et al. |
| 2006/0071938 A1 | 4/2006 | Richardson et al. |
| 2006/0245016 A1 | 11/2006 | Fukao et al. |
| 2006/0262339 A1 | 11/2006 | Jacobs et al. |
| 2006/0274341 A1 | 12/2006 | Kumada et al. |
| 2006/0274939 A1 | 12/2006 | Yamada |
| 2007/0052996 A1 | 3/2007 | Ota |
| 2007/0057961 A1 | 3/2007 | Enami et al. |
| 2007/0086050 A1 | 4/2007 | Matsuda |
| 2007/0121172 A1 | 5/2007 | Hamada |
| 2007/0195353 A1 | 8/2007 | Tsunoda |
| 2007/0216930 A1 | 9/2007 | Jacobs et al. |
| 2008/0005176 A1 | 1/2008 | Shimizu |
| 2008/0024807 A1 | 1/2008 | Matsuda |
| 2008/0030750 A1 | 2/2008 | Kato |
| 2009/0002765 A1 | 1/2009 | Nordback |
| 2009/0244563 A1 | 10/2009 | Nordback |
| 2009/0310151 A1 | 12/2009 | Nordback |
| 2011/0075164 A1 | 3/2011 | Nordback |
| 2011/0157620 A1 | 6/2011 | Nordback |

FOREIGN PATENT DOCUMENTS

| | | |
|---|---|---|
| JP | 09-052392 A | 2/1997 |
| JP | 2003-51939 A | 2/2003 |
| JP | 2005-354414 | 12/2005 |
| JP | 2006-352755 | 12/2006 |

OTHER PUBLICATIONS

Office Action dated Mar. 11, 2010, in U.S. Appl. No. 11/771,973, filed Mar. 14, 2007 Nordback.

(56) References Cited

OTHER PUBLICATIONS

Office Action dated Aug. 16, 2010, in U.S. Appl. No. 11/771,973, filed Mar. 14, 2007 Nordback.
Office Action dated Aug. 2, 2011, in U.S. Appl. No. 11/771,973, filed Mar. 14, 2007 Nordback.
Office Action dated Dec. 15, 2011, in U.S. Appl. No. 11/771,973, filed Mar. 14, 2007 Nordback.
U.S. Appl. No. 12/078,112, filed Mar. 27, 2008.
Office Action dated May 11, 2010, in U.S. Appl. No. 12/078,112, filed Mar. 27, 2008 Nordback.
Notice of Allowance dated Nov. 1, 2010, in U.S. Appl. No. 12/078,112, filed Mar. 27, 2008 Nordback.
U.S. Appl. No. 12/138,028, filed Jun. 12, 2008.
Office Action dated Aug. 15, 2011, in U.S. Appl. No. 12/138,028, filed Jun. 12, 2008 Nordback.
Office Action dated Jan. 12, 2012, in U.S. Appl. No. 12/138,028, filed Jun. 12, 2008 Nordback.
Office Action dated May 3, 2012, in U.S. Appl. No. 12/138,028, filed Jun. 12, 2008 Nordback.
U.S. Appl. No. 12/571,131, filed Sep. 30, 2009.
U.S. Appl. No. 12/650,925, filed Dec. 31, 2009.
Office Action dated Aug. 13, 2012, in U.S. Appl. No. 11/771,973, filed Mar. 14, 2007 Nordback.
Office Action dated Sep. 25, 2012, in U.S. Appl. No. 12/138,028, filed Jun. 12, 2008 Nordback.
Office Action dated Aug. 8, 2012, in U.S. Appl. No. 12/571,131, filed Jun. 12, 2008 Nordback.
Lorem Ipsum "*All the facts—Lipsum Generator*," Oct. 11, 2012; http://web.archive. org/web/20020123143646// http://lipsum.com/ (Jan. 2002), 2 pages.
Notification of Refusal mailed Nov. 20, 2012, issued in related Japanese Patent Application No. 2008-166668, 3 pages.
Notice of Allowance dated Dec. 31, 2012, in U.S. Appl. No. 11/771,973, filed Mar. 14, 2007, 9 pages.
Notification of Reasons for Refusal with English language translation mailed by the Japanese Patent Office on Jun. 25, 2013, in counterpart Japanese application No. 2009-31108.

\* cited by examiner

DEMOTION TABLE 30

| Entity | Page Flag | Swath 320 Flag | Swath 330 Flag |
|---|---|---|---|
| Begin page 310 | 1 | | |
| Begin swath 320 | | 1 | |
| Object 321 | | 1 | |
| Object 322 | | 1 | |
| End swath 320 | 1 | | |
| Begin swath 330 | | | 1 |
| Object 331 | | | 1 |
| Object 332 | | | 0 |
| End swath 330 | 0 | | |
| End page 310 | | | |

FIG. 3

SYSTEMS AND METHODS FOR DATA COMPRESSION

TECHNICAL FIELD

This disclosure relates to data compression and in particular, to systems and methods for demoting color data.

DESCRIPTION OF RELATED ART

Image printing and display systems typically use a full-color color space to handle image data. For example, an image display system (e.g., a monitor) may use a Red, Green, and Blue ("RGB") color space to represent display data, and an image printing system (e.g., a color printer) may use a Cyan, Magenta, Yellow, and BlacK ("CMYK") color space to process print data. Under such multi-plane color space representations, color data may be multi-dimensional, thereby greatly increasing storage and processing costs.

However, color printing and/or display jobs may include a significant portion of grayscale data. For example, some printing jobs may consist of only black text, or a large amount of black text and a color image. Other printing jobs may include a mix of black and colored graphics, or black-and-white images intermingled with color images. Because grayscale data can be adequately represented by a one-dimensional grayscale color space, it may be inefficient for a color printing system to process an entire print job with grayscale data using a full-color color space. For instance, storing grayscale data using a full-color color space representation may require between 3-4 times more memory. Moreover, reading and writing the data may also be slower by a similar factor.

Conventionally, sophisticated compression methods (e.g., JPEG) may be used to reduce the size of color data. When a compression method is applied to multi-dimensional color data that are in fact grayscale, the size of the color data may be reduced significantly.

Although the systems and methods disclosed in the prior art can be used to effectively compress color data, they may nevertheless be suboptimal. For example, compression and decompression may impose significant time and memory costs. Moreover, color data may often be processed while uncompressed thereby diluting much of the potential gain from compression. For example, image processing such as rendering and rasterizing may be performed when an image is uncompressed and therefore result in the processing of multi-dimensional color data. Therefore, there is a need for systems and methods that represent grayscale data more efficiently on a color printing or display system.

SUMMARY

In accordance with the present invention, systems and methods are provided for demoting color data associated with at least one entity, wherein the entity comprises at least one sub-entity. The at least one sub-entity may be marked as demotable, if the color data associated with the at least one sub-entity is demotable. The at least one entity may be marked as demotable, if all sub-entities enclosed in the at least one entity are demotable. The color data of at least one marked rasterizable entity may be demoted, wherein the at least one marked rasterizable entity may be selected from a set comprising of marked entities and marked sub-entities.

Embodiments of the present invention also relate to software, firmware, and program instructions created, stored, accessed, or modified by processors using computer-readable media or computer-readable memory. The methods described may be performed on one or more of a computer, a display device, and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
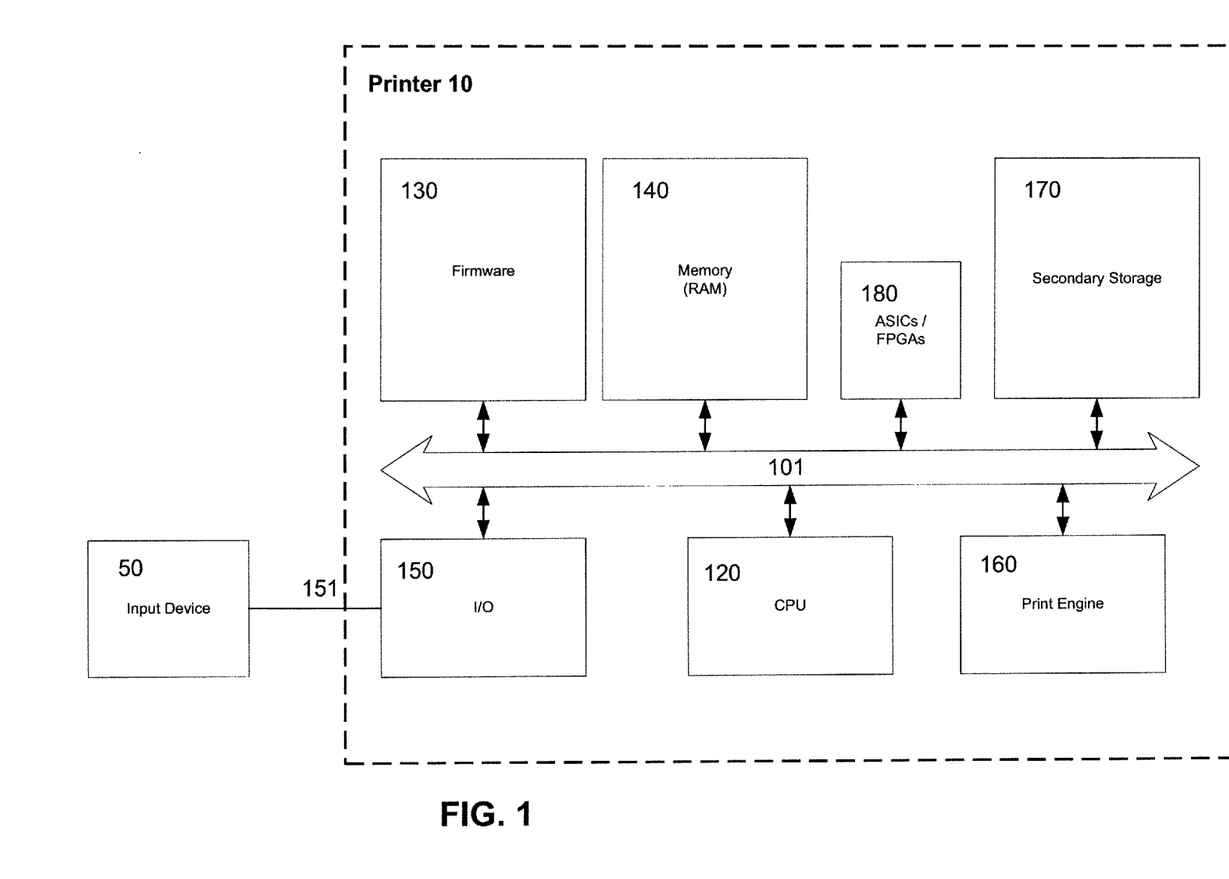
FIG. 1 shows a block diagram of an exemplary printer.

FIG. 1 shows a block diagram of an exemplary printer 10, according to the disclosed embodiments. In general, printer 10 may be any device that can be configured to produce physical documents from electronic data including, but not limited to, electro-photographic printers, such as laser printers and LED printers, ink-jet printers, thermal printers, laser imagers, and offset printers. Printer 10 may have an image transmitting/receiving function, an image scanning function, and/or a copying function, as installed in facsimile machines and digital copiers. The methods and apparatus described in this document may also be applied to these various printer device types with appropriate modifications and in a manner consistent with embodiments disclosed herein.

In some embodiments, printer 10 may include an input-output port 150, and printer 10 may be able to access an input device 50 using I/O ports 150 and connection 151. Printer 10 may receive input color data from input device 50. For example, input device 50 may be a general purpose computer, such as, a computer workstation, desktop computer, laptop computer, or any other computing device capable of being used with printer 10. In one exemplary embodiment, an I/O port may also be included in input device 50 as an interface to send and receive data via connection 151.

Input device 50 may be coupled to printer 10 via a wired or wireless connection 151 using conventional communication protocols and/or data port interfaces. In general, connection 151 can be any communication channel that allows transmission of data between the devices. In one embodiment, for example, the devices may be provided with conventional data ports, such as USB, FIREWIRE and/or serial or parallel ports for transmission of data through appropriate connection 151. The communication links could be wireless links or wired links or any combination consistent with embodiments of the present invention that allows communication between input device 50 and printer 10.

Exemplary printer 10 may further include a CPU 120, a firmware 130, a memory 140, a print engine 160, and secondary storage device 170. In some embodiments, CPU 120, firmware 130, memory 140, I/O port 150, and secondary storage device may be coupled using a data bus 101. Data received by I/O port 150 may be placed in memory 140 under the control of the CPU 120 according to some embodiments. In some embodiments, printer 10 may be capable of executing software including a printer operating system and other appropriate application software. In some embodiments, printer 10 may allow paper sizes, output trays, color selections, and print resolution, among other options, to be user-configurable.

In some embodiments, firmware 130 may hold instructions and data including, but not limited to, a boot-up sequence, pre-defined routines, routines to perform color space conversions, and other codes. In some embodiments, code and data in firmware 130 may be copied to memory 140 prior to being acted upon by CPU 120. In one embodiment, data and instructions in firmware 130 may be upgradeable.

In some embodiments, firmware 130 may include a display list constructing routine. A display list may be a series of graphics commands that define an output image and an image may be created (e.g., rendered) by executing the commands. In some embodiments, firmware 130 may further include a color data rasterization routine. The color data rasterization routine may transform the color data commands of the display list to bitmap data. The color data rasterization routine may further use a frame buffer that includes information related to how pixels will be printed by printer 10 on a print medium. The frame buffer may be stored in memory 140 or secondary storage device 170. Rasterized bitmap data may be stored in the frame buffer. In some embodiments, the color data rasterization routine may rasterize color data block by block, when the size of the color data is relatively large. For example, color data of a band of the print page may be rasterized at a time.

Exemplary printer 10 may use a color space to represent color data, such as, a standard RGB (sRGB) color space, a CMY color space, a CMYK color space, or any other types of color spaces. The color space may include multiple color planes. For example, an sRGB or a CMY color space may include three color planes, and a CMYK color space may include four color planes. In some embodiments, color data may be stored as multi-dimensional data in memory 140 and/or secondary storage device 170. In some embodiments, color data may also be transferred among CPU 120, firmware 130, memory 140, I/O port 150, secondary storage 170, and print engine 160 as one-dimensional data or multi-dimensional data. In addition, routines included in firmware 130 may also process the color data in multiple color planes. In some embodiments, the multi-dimensional color data may be transferred and/or processed in a parallel manner or a sequential manner. For example, rasterization routine may rasterize C, M, Y, K color data in a parallel manner.

For the purpose of the present disclosure, an entity may be any set of data that includes color information and is independent from other such sets of data. In some embodiments, an entity may be stored, processed, or transferred independently. For example, an entity may be a display list object that includes a subset of the input color data, such as an image or a color fill command. As another example, an entity may be a group or canvas that is rendered into an independent memory space before being flattened into its parent structures. As a further example, the input color data may represent an image (e.g., a print page), and an entity may also be a geometric subset of the image, such as a band, a swath or a tile, that is maintained in an implementation-specific manner to reduce memory usage or increase rasterization speed. In some embodiments, an entity may be an entire print page or an entire print job, in which case the entity may include all input color data.

In some embodiments, the color data to be printed may be purely grayscale data. For example, the print page may include only black text. In some other embodiments, the color data may include several entities, and one or more entities may include only grayscale data. In some embodiments, the color data to be printed may include an entity of black text and another entity of a color picture. Such grayscale data may be sufficiently represented by a one-dimensional grayscale color space.

In some embodiments, entities may form a hierarchy of various nesting levels. One entity may be nested in another entity of a higher level. For example, a band including text data may be an entity nested in an entity of the entire print page, and the band entity may in turn have a lower level object entity nested in it. For the purpose of the present disclosure, an entity that is nested in another is called "a sub-entity," and the entity in which a sub-entity is nested is called "an enclosing entity." For example, the print page entity, band entity and object entity in the above example form a hierarchy of three levels, where the print page entity is an enclosing entity of the band entity, the band entity is a sub-entity of the print page and an enclosing entity of the object entity, and the object entity is a sub-entity of the band entity.

In order to reduce the resource requirements for storing, processing, and transferring color data on printer 10, color data of entities that include pure grayscale data may be demoted. For the purpose of the present disclosure, a color space is called "demotable" if it can be converted to a color space of lower dimensions. For example, color spaces in a general class of RGB, CMY, or CMYK are demotable since they can be converted to a one-dimensional color space. Color data are called "demotable" if the data can be represented in a demotable color space and when the demoted data can be represented accurately in a color space of lower dimension. For example, color data in an RGB color space where the data in the R, G, and B planes are identical (i.e., the image has achromatic color R=G=B) can be represented accurately in a one-dimensional space, and is therefore demotable. An entity is called "demotable" if all color data in the entity are demotable. For example, a swath entity of a print page that includes only black text is demotable because the corresponding color data can be demoted to grayscale data.

In some embodiments, firmware 130 may include routines to perform a color data demotion process on the color data of printer 10. According to some embodiments, firmware 130 may include the portions of the color data demotion routines as sub-routines of a display list construction routine. For example, entities may be written into the display list in a sequential order, and the color data demotion routines may determine whether the color data of the entities are demotable. In some embodiments, some portions of the color data demotion routines may be included as sub-routines of a color data rasterization routine stored in firmware 130. For example, the color data demotion routines may demote the color data of demotable entities and the color data rasterization routine may rasterize the demoted color data in its demoted form.

For the purposes of this description, a demoted color space may be defined as a set of values in m-dimensions corresponding to demotable color values in an n-dimensional color space, where $m \leq n$. Demotable color values are those for which an inverse function termed promotion exists to recover the n-dimensional color data from the m-dimensional demoted color space. For example, the set of values given by C={(R,G,B), where R=G=B}, is demotable in the three-dimensional RGB color space and may correspond to the set C'={(R)}, or {(G)}, or {(B)} in a one-dimensional demoted color space. Values where R=G=B in the three-dimensional RGB color space are demotable because they may be recovered by replicating values in the one-dimensional demoted color space C'={(R)}, (or {(G)}, or {(B)}) across the other two color planes. In general, properties that make a set of values demotable in a color space may be specific to that color space and may also be determined by the application utilizing the color information.

In some embodiments, demotion of color data may be implemented by converting the color data from a color space of higher dimension to another color space of lower dimension. For example, demotable color data may have all pixels being zeroes in the C, M and Y planes (i.e., C=M=Y=0), and such color data may be converted from the CMYK color space, to a one-dimensional color space. The color conversion may include removing pixel values in the C, M, and Y planes (since C=M=Y=0), and saving the pixel values in the K-plane as a one-dimensional data vector. According to one embodiment, the demotion may be implemented using a color management module of printer 10. In some embodiments, demotion of color data may also be implemented by using a more concise representation of the color data in the color space of higher dimension. For example, if pixel values in the C, M, and Y planes for an entity with demotable CMYK color data are all zero and the K-plane includes substantive data, then data for the C, M, and Y planes may not be stored or processed by printer 10.

It is also contemplated that portions of routine to perform one or more color data demotion operations may be stored on a removable computer readable medium, such as a hard drive, computer disk, CD-ROM, DVD ROM, CD±RW or DVD±RW, USB flash drive, memory stick, or any other suitable medium, and may run on any suitable subsystem of printer 10. For example, portions of applications to perform color space conversion operations may reside on a removable computer readable medium and be read and acted upon by CPU 120 using routines in firmware 130 that have been copied to memory 140.

In some embodiments, CPU 120 may be a general-purpose processor, a special purpose processor, or an embedded processor. CPU 120 can exchange data including control information and instructions with memory 140 and/or firmware 130. Printer 10 may also include other Application Specific Integrated Circuits (ASICs), and/or Field Programmable Gate Arrays (FPGAs) 180 that are capable of executing portions of applications to perform color data demotion process consistent with disclosed embodiments.

In some embodiments, input color data, color space profiles, and demoted color data may be stored in memory 140 or secondary storage 170. Memory 140 may be any type of Dynamic Random Access Memory ("DRAM") such as, but not limited to, SDRAM, or RDRAM. Exemplary secondary storage 170 may be an internal or external hard disk, Memory Stick™, or any other memory storage device capable of being used in printer 10. Memory to store the demoted color data or any other data related to the color demotion process may be a dedicated memory or form part of a general purpose memory, or some combination thereof according to some embodiments of the present invention. In some embodiments, memory may be dynamically allocated to hold the data as needed. In some embodiments, memory allocated to store the data may be dynamically released after processing.

In some embodiments, CPU 120 may act upon instructions and data and provide control and data to ASICs/FPGAs 180 and print engine 160 to generate printed documents. In some embodiments, ASICs/FPGAs 180 may also provide control and data to print engine 160. FPGAs/ASICs 180 may also implement one or more of translation, compression, and color conversion algorithms.

In some embodiments, printer 10 may be a laser color printer and print engine 160 may include several components (not shown) such as a driver circuit, a mechanical controller, a beam detect sensor, a transfer belt position sensor, and a printhead. In some embodiments, laser light from the printhead can be reflected off a scanning mirror and a beam-to-drum guide mirror, and may cause a latent image of charged and discharged areas to be built up on a photosensitive drum. Latent images from the photosensitive drum may be developed with a toner at a developing station before being transferred to a print medium, such as paper. Paper may be passed to a transfer belt where the toner images developed at the developing station may be transferred to the paper.

In some embodiments, for a multi-component image, such as a color image, the latent image building process may repeat for each of the components. For example, for CMYK color printers, which use cyan ("C"), magenta ("M"), yellow ("Y"), and black ("K"), the latent image building process on the photosensitive drum may be repeated for each of the colors C, M, Y, and K. Toner images of all four colors may be accumulated on the transfer belt before a complete toner image is transferred to the paper.

In some embodiments, when color data for a particular entity is demoted during rasterization, the latent image building process may be performed for the demoted color data in the demoted color space. For example, for an entity that includes grayscale data and no color data, CMYK color printers may build up a latent image for the black color (K) on the photosensitive drum and a black toner image may be transferred to the paper for printing. Data in the C, M, and Y planes can be ignored.

Figure 2:
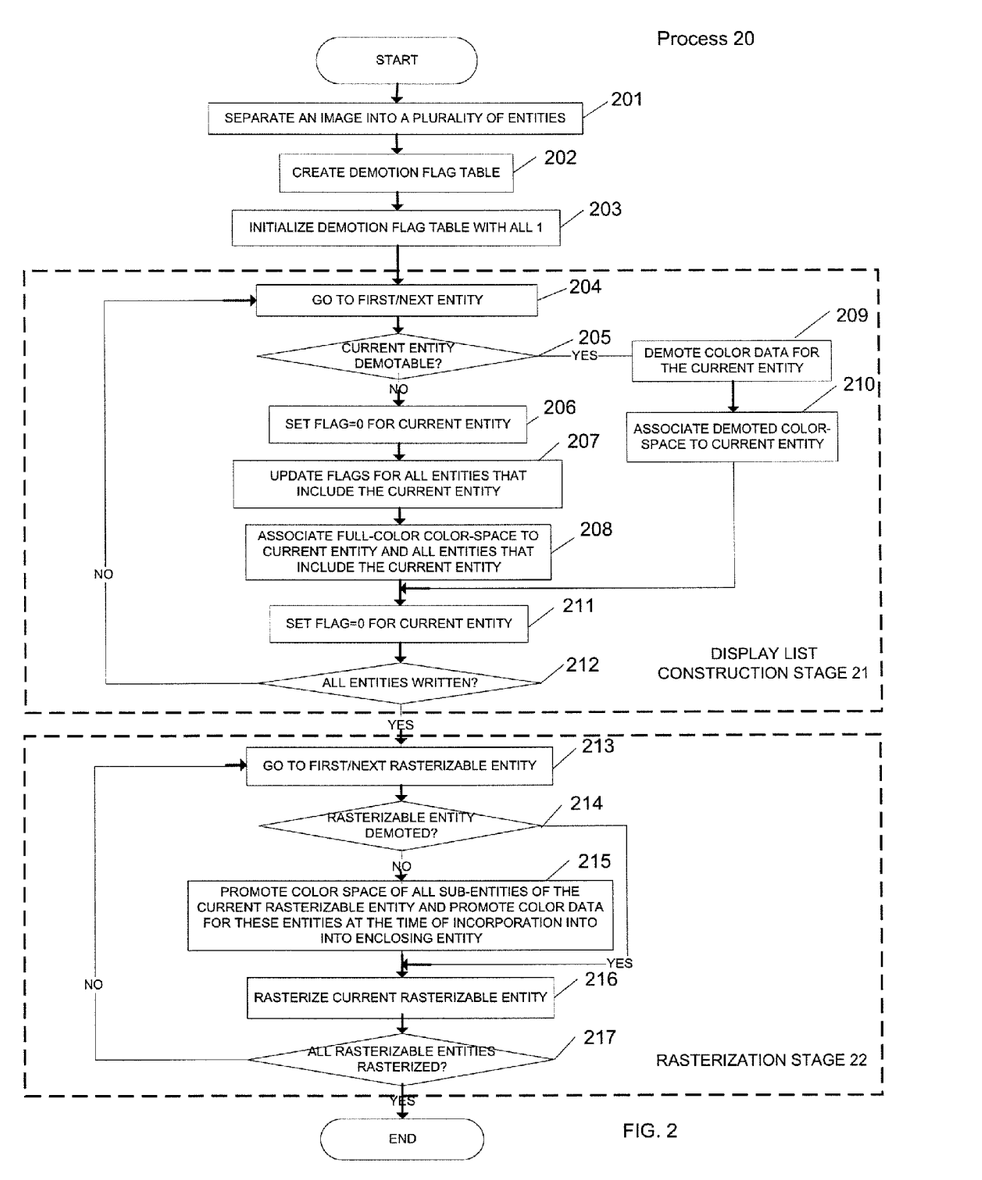
FIG. 2 is a flow chart of an exemplary operation process for demoting color data.

FIG. 2 is a flow chart of an exemplary operation process 20 for demoting color data consistent with disclosed embodiments. The algorithm described in FIG. 2 may be applied to printer 10 described above, or to various other types of printing devices such as, for example, copiers and multi-function devices, and various types of visual display devices such as, for example, monitors, with appropriate modifications specific to the device and in a manner consistent with embodiments disclosed herein.

In step 201, a print image may be separated into a plurality of entities. For example, a print page may be separated into several swaths. In some embodiments, entities may form a hierarchy of various nesting levels, such that one entity may be nested in another entity of a higher level. For example, each of the swath entities in the example above may have one or more lower level object sub-entities nested in it. The print page entity, swath entities, and object entities in the example form a hierarchy of three levels. The swath entity and the object entities are sub-entities of the print page entity, while the object entities are sub-entities of the swath entity. In step 201, a list of entities may be created which may be used later in constructing a display list.

In step 202, a demotion flag table may be created. The demotion flag table may include a plurality of demotion flags, each corresponding to an entity of the image. In some embodiments, the demotion flags may be Boolean flags which take a value of either true (1) or false (0). When a demotion flag is true, it may indicate that the corresponding entity is demotable. Similarly, when a demotion flag is false, it may indicate that the corresponding entity is not demotable.

It is contemplated that the demotion flags may also be any other types of flags, such as integer flags.

In step 203, all the demotion flags may be initialized to a pre-determined status. In some embodiments, the demotion flags may be initialized to true, indicating that all the entities are demotable. Alternatively, the demotion flags may also be initialized to false, indicating that all the entities are non-demotable. The demotion flags in the demotion flag table may be updated at various points during the processing of the display list.

In some embodiments, the demotion flag of an enclosing entity may be set based on the demotion flags of all its sub-entities. For example, the demotion flag of the enclosing entity may be set true if all demotion flags of its sub-entities are true, and the demotion flag of the enclosing entity may be set false if any demotion flags of its sub-entities are false. As another example, if the demotion flag of an enclosing entity is true, incorporating a sub-entity with a false flag into the enclosing entity may change the demotion flag of the enclosing entity to false. If the demotion flag of an enclosing entity is false, incorporating a sub-entity with either a false flag or true flag into the enclosing entity may not change the demotion flag of the enclosing entity. For the purpose of illustration, in the exemplary embodiment shown in FIG. 2, all the demotion flags are initialized to true (all flags=1).

After the demotion flag table is initialized, the display list construction stage 21 may begin and may include steps 204-212. In step 204, the first or the next entity may be considered and processed. In some embodiments, entities may be processed in a hierarchical order. For example, processing of an enclosing entity may begin before processing of any of its sub-entities begin, and end after processing of all of its sub-entities end.

In step 205, it may be determined if the current entity is demotable. An entity is demotable if all the color data in the entity are demotable. Color data are demotable if the data can be represented accurately in a demotable color space of lower dimension. In some embodiments, the color space associated with the current entity may be checked to determine whether the color space is demotable. For example, if the associated color space is CMYK color space, it may be deemed demotable. Next, color data of the current entity may be checked to determine whether the data can be represented in a color space of lower dimension. For example, if color data can be represented in a CMYK color space and if all pixel values in C, M, and Y planes are zeroes (i.e., C=M=Y=0), the color data can be accurately represented in a one-dimensional space, and thus the color data may be determined demotable. As another example, if color can be represented in an RGB color space and if the pixel values in R, G and B planes are identical (i.e., R=G=B), color data may be determined demotable. As a further example, if color can be represented in a CMY color space and if the pixel values in C, M and Y planes are identical (i.e., C=M=Y), color data may be determined demotable. Accordingly, if the color data of the current entity is demotable, the current entity may be determined demotable.

if the current entity is determined not demotable in step 205, the demotion flag of the current entity may be set to false (i.e., flag=0) in step 206. In step 207, demotion flags for all entities that include the current entity may be updated based on the update of the current demotion flag. For example, if a current entity with a demotion flag of false is incorporated into, and nested in, an enclosing entity with a demotion flag of true, then the demotion flag of the enclosing entity may be set to false. No update may be performed for any enclosing entities with false demotion flags.

In some embodiments, the enclosing entities of the current entity may form a hierarchy among themselves and the demotion flags of these enclosing entities may be updated in the order of their levels in the hierarchy. For example, the current entity may be nested in a swath entity, which may be further nested in a page entity. The demotion flag of the swath entity may be updated first based on the demotion flag of the current entity, and then the demotion flag of the page entity may be updated based on the demotion flag of the swath entity. When the demotion flag of the current entity is set false, demotion flags of all enclosing entities of the current entity may also be set to false.

In step 208, a full-color color-space may be associated with the current entity and all entities that include the current entity. For example, the color space of printer 10, such as a CMYK color space, may be associated with the current entity and all its enclosing entities that are not demotable.

If the current entity is deemed to be demotable in step 205, the demotion flag may not be updated, and in step 209, color data of the current entity may be demoted. In some embodiments, it may be first determined if the current entity is a rasterizable entity. For the purpose of the current disclosure, a rasterizable entity may be any set of data comprising color information that may be independently rasterized from other such sets of data. As an example, a rasterizable entity may be a geometric subset of the print page, such as a band, a swath, or a tile, that may be maintained in an implementation-specific manner to reduce memory usage or increase rasterization speed. In some embodiments, a rasterizable entity may be an entire print page or an entire print job. Accordingly, color data of the current entity may be demoted if the current entity is a rasterizable entity. As another example, a rasterizable entity may also be an individual drawable object, such as a character of text, a fill command, an image command, etc.

In some embodiments, demotion of color data for an entity may be implemented by converting color data from a color space of higher dimension to a lower dimensional representation. For example, CMYK color data with zero-valued C, M, and Y planes, may be converted to a one-dimensional representation. Such a conversion may include deleting data in the C, M, and Y planes (since C=M=Y=0), and retaining the pixel values in the K-plane to obtain the one-dimensional representation. As another example, RGB color data with identical pixel values in the R, G and B planes (i.e., R=G=B) may be converted to a one-dimensional representation. Such a conversion may include retaining data in any one plane (e.g., R-plane) and deleting data in the other two planes (e.g., G and B planes). As a further example, CMY color data with identical pixel values in the C, M, and Y planes (i.e., C=M=Y) may be converted to a one-dimensional representation. Such a conversion may include retaining data in any one plane (e.g., C-plane) and deleting data in the other two planes (e.g., M and Y planes). In one embodiment, the demotion may be implemented on a color management module of printer 10. In step 210, the corresponding demoted color-space may be associated with the current entity. For example, a one-dimensional space may be associated with a entity that includes only black text.

In some embodiments, in step 209, demotion of color data may also be implemented by a more concise representation of the color data in the color space of higher dimension. For example, the zero pixel values in the C, M and Y planes may not be stored or processed by printer 10 even if the color data are still represented by a CMYK color space. According to this embodiment, in step 210, a Boolean flag may be attached to the current entity to indicate if the color data of the current entity has been demoted. For example, a Boolean flag of true may indicate that the color data of the current entity has been demoted in step 209.

After step 208 or step 210, the algorithm may proceed to step 211. In step 211, the current entity may be written into an display list. For example, if the current entity is determined as demotable in step 205, the current entity may be written in full color into the display list. If the current entity is determined as not demotable in step 205, the current entity may be written in a demoted form into the display list. In step 212, the algorithm determines if the color data of all entities have been written into the display list and considered. If the color data of all the entities have been considered, then the algorithm may proceed to a rasterization stage 22. If any of the entity has not been considered, the algorithm may iterate through steps 204-212 until all the entities of the image in the display list have been considered.

Rasterization stage 22 may include steps 213-217. In step 213, the first or the next rasterizable entity may be considered. In some embodiments, some entities in the display list and considered in the display list construction stage 21 may also be a rasterizable entity. In some embodiments, rasterizable entities may be rasterized in a hierarchic order. For example, the processing of an enclosing entity may begin before the processing of any of its sub-entities begins, and end after the processing of its sub-entities have completed.

In step 214, the algorithm may determine if the current rasterizable entity is demoted. In some embodiments, the demotion flag of the current entity may be looked up in the demotion flag table. If the demotion flag is true, the current rasterizable entity may be determined demoted, and if the demotion flag is false, the current entity of interest may be determined not demoted. In some embodiments, the color space associated with the current entity may be checked. If the color space is a demoted space, the current rasterizable entity may be determined demoted, and if the color space is a full-color space, the current entity of interest may be determined not demoted. In some embodiments, the Boolean flag attached to the current entity may be checked. If the Boolean flag is true, the current rasterizable entity may be determined demoted, and if the Boolean flag is false, the current entity of interest may be determined not demoted.

If the current rasterizable entity is determined not demoted then, in step 215, color spaces for all sub-entities of the current rasterizable entity that have previously been demoted may be promoted at the time the sub-entity is incorporated into enclosing entity. For example, in an RGB color space, a sub-entity such as a swath of with R=G=B, which may have been demoted to a one-dimensional space previously, can be promoted back to three dimensions with the appropriate R, G, and B values at the time it is incorporated into its enclosing entity. In some embodiments, the promotion may be performed right before printing. Data promotion before printing ensures that the accuracy of color data in the original color space is preserved when data from color planes is used to place marks on the page.

In some embodiments, promotion of color data may be implemented by converting the color data from a color space of lower dimension to another color space of higher dimension. In some embodiments, promotion of color data may also be implemented as recovering color data from a concise representation in the color space of higher dimensions. For example, color data may be converted from a one-dimensional color space to a full-color color space (e.g., a CMYK color space). For example, in a CMYK color space, with data in the K-plane only the C, M and Y planes may be zero-padded in the CMYK color space. Such a conversion may include setting all pixel values to be zero in the C, M, and Y planes (i.e., C=M=Y=0), and using the one-dimensional color data for the K-plane (i.e., K=D where D denotes the one-dimensional color data). As another example, color data may be converted from a one-dimensional color space to an RGB color space. Such a conversion may include saving the one-dimensional data repetitively in the R, G, and B planes (i.e., R=G=B=D). As a further example, color data may be converted from a one-dimensional color space to a CMY color space. Such a conversion may include saving the one-dimensional data repetitively in the C, M, and Y planes (i.e., C=M=Y=D). In one embodiment, the promotion may be implemented using a color management module of printer 10.

If the current rasterizable entity is determined demoted then the algorithm may skip step 215 and proceed to step 216 directly. In step 216, the current entity may be rasterized. In step 217, the algorithm determines if all entities of interest have been rasterized. If all entities of interest have been rasterized then, the algorithm may terminate. If any of the entities of interest have not been rasterized, the algorithm may iterate through steps 213-217 until all the entities of interest have been rasterized.

Figure 3:
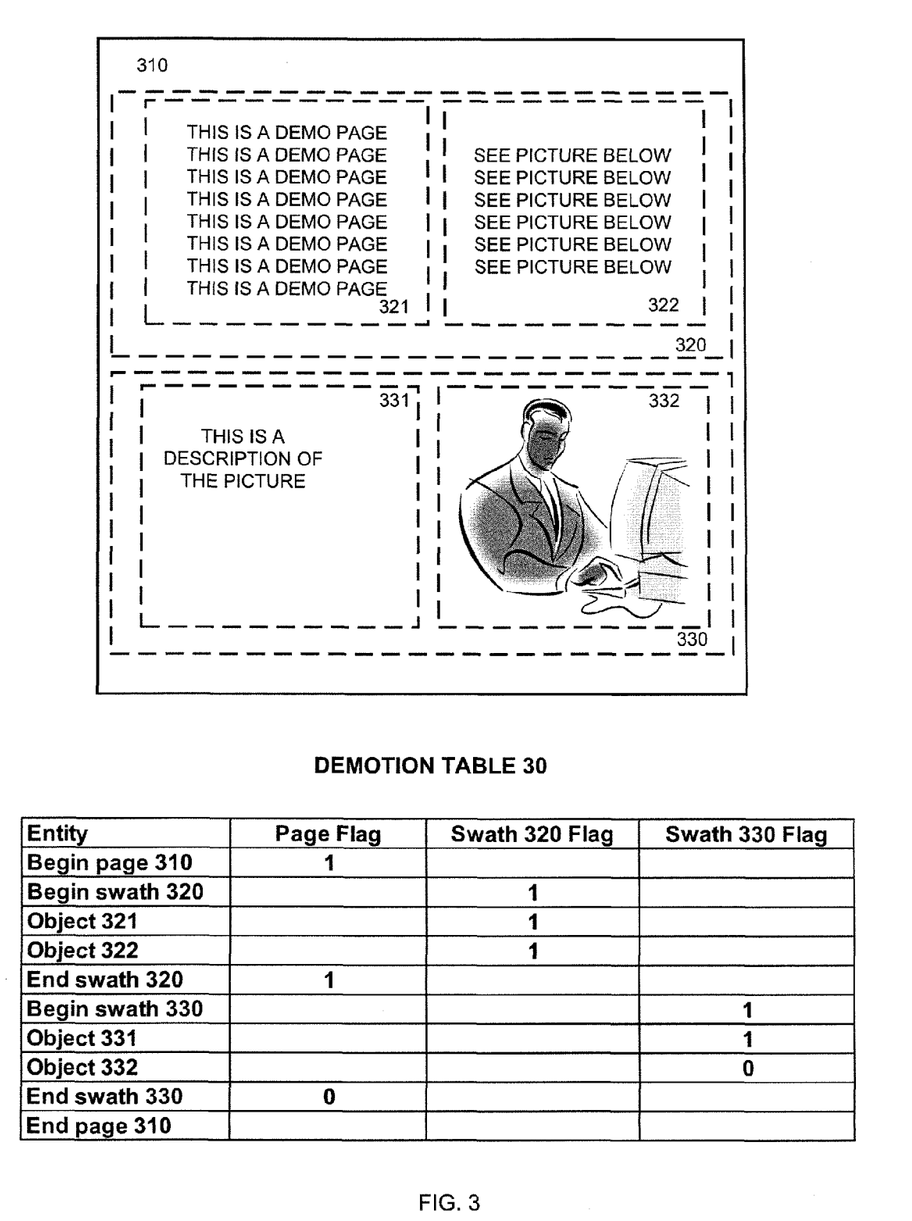
FIG. 3 is an illustration of an exemplary demotion flag table of an exemplary print page.

FIG. 3 is an illustration of an exemplary demotion flag table 30 of an exemplary print page 310. As shown in FIG. 3, print page 310 may include a swath 320 and a swath 330. Swath 320 may include an object 321 and an object 322, where both objects 321 and 322 include pure black text. Swath 330 may include an object 331 that includes pure black text and an object 332 that includes a color image. In this example, page 310 is an enclosing entity of swath 320 and swath 330, swath 320 is an enclosing entity of sub-entities object 321 and 322, and swath 330 is an enclosing entity of sub-entities object 331 and 332.

Demotion flag table 40 may be created, for example, in step 202 of exemplary process 20. For simplicity of description, only demotion flags for page 410, swath 320, and swath 330 have been shown in the exemplary demotion flag table 40. Demotion flag table 40 may also include demotion flags for objects 321, 322, 331 and 332. In some embodiments, demotion table 40 may be initialized such that all demotion flags are set to true, for example by setting demotion flags=1. For example, demotion flags for page 410, swath 320 and swath 330 may be initialized as true.

Demotion table 40 may be updated, for example, during the display list construction stage 21 of exemplary process 20. In some embodiments, entities may be processed in a hierarchic order. For example, display list commands corresponding to page 310 may begin first. Then, display list commands corresponding to swath 320 may begin. Color data of object 321 may be written into the display list. The algorithm may determine that object 321 is demotable because it includes pure black text and thus, its color data are pure grayscale data. The demotion flag of object 321 may be set true (not shown). Accordingly, the demotion flag of its enclosing entity swath 320 may not change.

Then, color data of object 322 may be written into the display list. The algorithm may determine that object 322 is also demotable because its color data are pure grayscale data. The demotion flag of object 322 may also be set true (not shown). Again, the demotion flag of its enclosing entity swath 320 may not change. Display list commands corresponding to swath 320 may end after object 322 is written in and considered. The demotion flag of swath 320 may remain true, as its initialized value, because all sub-entities (objects 321 and 322) of swath 320 are demotable. Accordingly, the demotion flag of its enclosing entity page 310 may remain true, as its initialized value.

Then, display list commands corresponding to swath 330 may begin. Color data of object 331 may be written into the display list. The algorithm may determine that object 331 is demotable because again it includes pure black text and thus, its color data are pure grayscale data. The demotion flag of object 331 may be set true (not shown). Accordingly, the demotion flag of its enclosing entity swath 330 may not change.

Then, color data of object 332 may be written into the display list. The algorithm may determine that object 332 is not demotable because it includes a color image and its color data has to be represented in a full-color color space. The demotion flag of object 322 may then be set false (not shown). Accordingly, the demotion flag of its enclosing entity swath 330 may be set false. Display list commands corresponding to swath 330 may end after object 332 is written in and considered. The demotion flag of swath 330 has been changed from true to false, because a sub-entity (object 332) of swath 330 is not demotable. Accordingly, the demotion flag of its enclosing entity page 310 may be set false because swath 330 is now non-demotable. Display list commands corresponding to page 310 may end after all entities are written in and considered. The construction of demotion flag table 40 may be completed afterwards.

Other embodiments of the invention will be apparent to those skilled in the art from consideration of the specification and practice of the invention disclosed herein. In particular, the methods described may be applied on some combination of computers, display devices, and/or printing devices. As one skilled in the art will appreciate the descriptions pertaining to printers are exemplary only and the methods disclosed can be applied with appropriate modifications to display and other devices where rasterization is performed. It is intended that the specification and examples be considered as exemplary only, with a true scope and spirit of the invention being indicated by the following claims.

What is claimed is:

1. A method for demoting color data associated with at least one band of a print page, wherein the band comprises a plurality of objects nested therein, the method comprising:
    marking an object as demotable, if the color data associated with the object is demotable;
    marking the at least one band as demotable, if all the plurality of objects nested in the at least one band are demotable;
    demoting the color data of the at least one marked band and the marked objects from an original color space to a demoted color space, wherein the original color space has a first dimension and a second dimension and the demoted color space has the first dimension but not the second dimension, and wherein demoting the color data includes removing color data in the second dimension of the original color space while keeping color data in the first dimension of the original color space;
    identifying a rasterizable band that is not demoted, the rasterizable band having a subset of the demoted objects nested therein;
    promoting the color data of the demoted objects nested in the rasterizable band from the demoted color space back to the original color space, wherein promoting the color data includes adding color data in the second dimension; and
    rasterizing the color data of the rasterizable band in the promoted form.

2. The method of claim 1, wherein demoting the color data of the at least one marked band and the marked objects includes:
    converting the color data from the original color space to the demoted color space; and
    associating the demoted color space with the respective at least one marked band and the marked objects.

3. The method of claim 2, wherein the original color space is an RGB color space, with identical data in the R, G, and B color planes, and the demoted color space comprises a single plane D, identical to one of the R, G, or B color planes.

4. The method of claim 2, wherein the original color space is a CMY color space, with identical data in the C, M, and Y color planes, and the demoted color space comprises a single plane D, identical to one of the C, M, or Y color planes.

5. The method of claim 2, wherein the original color space is a CMYK color space, with data in the C, M, and Y being all zeros, and the demoted color space comprises a single plane D, identical to the K color plane.

6. The method of claim 1, wherein demoting the color data of the at least one marked band and the marked objects further comprises:
    using a concise representation for the color data in a multiple-plane color space; and
    attaching an indicator to each of the at least one marked band and the marked objects, to indicate that the color data of the at least one marked band and the marked objects have been demoted.

7. The method of claim 1, wherein the color data are demoted when the color data are written into a display list.

8. A non-transitory computer-readable medium that contains instructions which, when executed by a processor, perform steps in a method for demoting color data associated with at least one band of a print page, wherein the band comprises a plurality of objects nested therein, the method comprising:
    marking an object as demotable, if the color data associated with the object is demotable;
    marking the at least one band as demotable, if all the plurality of objects nested in the at least one band are demotable;
    demoting the color data of the at least one marked band and the marked objects from an original color space to a demoted color space, wherein the original color space has a first dimension and a second dimension and the demoted color space has the first dimension but not the second dimension, and wherein demoting the color data includes removing color data in the second dimension of the original color space while keeping color data in the first dimension of the original color space;
    identifying a rasterizable band that is not demoted, the rasterizable band having a subset of the demoted objects nested therein;
    promoting the color data of the demoted objects nested in the rasterizable band from the demoted color space back to the original color space, wherein promoting the color data includes adding color data in the second dimension; and
    rasterizing the color data of the rasterizable band in the promoted form.

9. The computer-readable medium of claim 8, wherein demoting the color data of the at least one marked band and the marked objects includes:
    converting the color data from the original color space to the demoted color space; and
    associating the demoted color space with the respective at least one marked band and the marked objects.

10. The computer-readable medium of claim 9, wherein the original color space is an RGB color space, with identical data in the R, G, and B color planes, and the demoted color space comprises a single plane D, identical to one of the R, G, or B color planes.

11. The computer-readable medium of claim 9, wherein the original color space is a CMY color space, with identical data in the C, M, and Y color planes, and the demoted color space comprises a single plane D, identical to one of the C, M, or Y color planes.

12. The computer-readable medium of claim 9, wherein the original color space is a CMYK color space, with data in the C, M, and Y being all zeros, and the demoted color space comprises a single plane D, identical to the K color plane.

13. The computer-readable medium of claim 8, wherein demoting the color data of the at least one marked band and the marked objects further comprises:
using a concise representation for the color data in a multiple-plane color space; and
attaching an indicator to each of the at least one marked band and the marked objects, to indicate that the color data of the at least one marked band and the marked objects have been demoted.

14. A color data demoting system, comprising:
an input interface configured to receive color data associated with at least one band of a print page, wherein the band comprises a plurality of objects nested therein;
a storage device configured to store the color data and instructions for demoting the color data; and
a processor coupled to the input interface and the storage device, wherein the processor is configured to execute the instructions to perform the steps of:
marking an object as demotable, if the color data associated with the object is demotable;
marking the at least one band as demotable, if all the plurality of objects nested in the at least one band are demotable;
demoting the color data of the at least one marked band and the marked objects from an original color space to a demoted color space, wherein the original color space has a first dimension and a second dimension and the demoted color space has the first dimension but not the second dimension, and wherein demoting the color data includes removing color data in the second dimension of the original color space while keeping color data in the first dimension of the original color space;
identifying a rasterizable band that is not demoted, the rasterizable band having a subset of the demoted objects nested therein;
promoting the color data of the demoted objects nested in the rasterizable band from the demoted color space back to the original color space, wherein promoting the color data includes adding color data in the second dimension; and
rasterizing the color data of the rasterizable band in the promoted form.

15. The system of claim 14, wherein demoting the color data of the at least one marked band and the marked objects includes:
converting the color data from the original color space to the demoted color space; and
associating the demoted color space with the respective at least one marked band and the marked objects.

16. The system of claim 15, wherein the original color space is an RGB color space, with identical data in the R, G, and B color planes, and the demoted color space comprises a single plane D, identical to one of the R, G, or B color planes.

17. The system of claim 15, wherein the original color space is a CMY color space, with identical data in the C, M, and Y color planes, and the demoted color space comprises a single plane D, identical to one of the C, M, or Y color planes.

18. The system of claim 15, wherein the original color space is a CMYK color space, with data in the C, M, and Y being all zeros, and the demoted color space comprises a single plane D, identical to the K color plane.

19. The system of claim 14, wherein demoting the color data of the at least one marked band and the marked objects further comprises:
using a concise representation for the color data in a multiple-plane color space; and
attaching an indicator to each of the at least one marked band and the marked objects, to indicate that the color data of the at least one marked band and the marked objects have been demoted.

20. The system of claim 14, wherein the color data are demoted when the color data are rasterized on a color printing system in which the color data demoting system is comprised.

21. The method of claim 1, wherein each object includes a plurality of pixels and the color data associated with each object include color data of the plurality of pixels.

22. The computer-readable medium of claim 8, wherein each object includes a plurality of pixels and the color data associated with each object include color data of the plurality of pixels.

23. The system of claim 14, wherein each object includes a plurality of pixels and the color data associated with each object include color data of the plurality of pixels.

* * * * *